Oct. 1, 1963

C. M. SALFISBERG 3,105,609

APPARATUS FOR FEEDING TABLETS

Filed Sept. 11, 1961

INVENTOR.
Charles Marshall Salfisberg,
BY
ATTORNEY

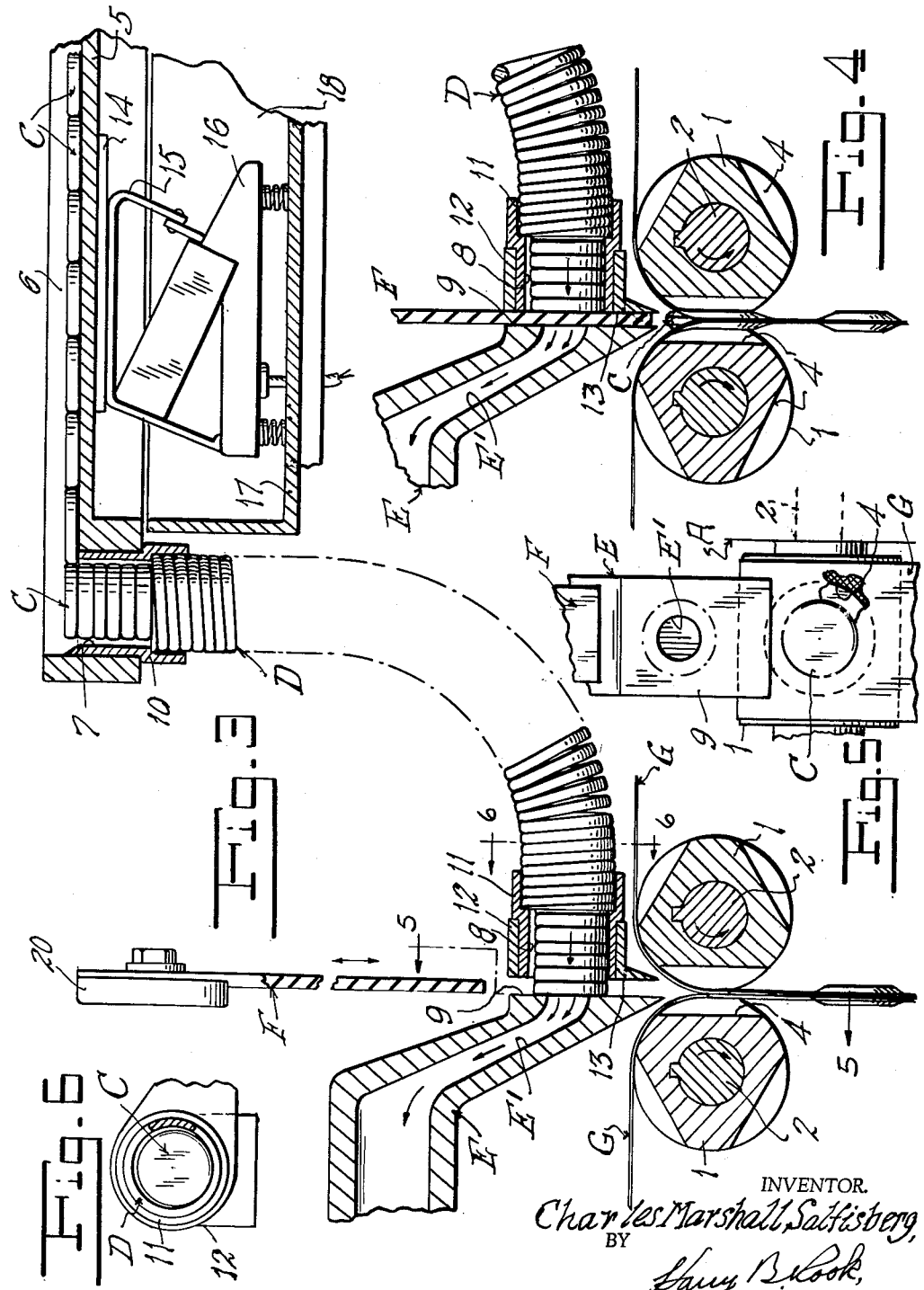

3,105,609
APPARATUS FOR FEEDING TABLETS
Charles Marshall Salfisberg, Millburn, N.J., assignor to Ivers-Lee Company, Newark, N.J., a corporation of Delaware
Filed Sept. 11, 1961, Ser. No. 137,258
2 Claims. (Cl. 221—176)

This invention relates to means for conveying and feeding articles such as tablets from a source of supply to a desired point, and more particularly, the invention contemplates improvements in the feeding of tablets to mechanisms for packaging articles.

The invention is particularly useful in connection with packaging mechanism of known type, for example, such as shown in United States Patent No. 2,083,617 dated June 15, 1937 and Patent No. 2,653,434 dated September 29, 1953. The mechanism shown in those patents includes two sealing rollers for sealing articles such as tablets between two continuous strips or webs of packaging material, and means for feeding articles to and forcing them between the webs of material as the latter pass between the rollers.

One object of the present invention is to provide a method and apparatus for feeding articles such as tablets from a source of supply in which gravitational forces and suction are utilized in a novel and improved economical manner.

Further objects are to provide such a method and apparatus which shall include a novel and improved conduit for conducting the articles from a source of supply to the desired point such as the packaging mechanism; and to provide such a conduit in combination with a suction head for momentarily holding the leading article in the conduit, and means for pushing said leading article from the suction head and the conduit to the desired point such as between webs of packaging material passing between sealing rollers.

Other objects, advantages and results of the invention will be brought out by the following description in conjunction with the accompanying drawings in which:

FIGURE 3 is a greatly enlarged fragmentary central vertical sectional view approximately on the plane of the line 3—3 of FIGURE 2, showing the articles being held by the suction head at the end of the conduit;

FIGURE 4 is a similar view showing the pushing of the article from the suction head and the conduit to a point between the webs of the packaging material;

FIGURE 5 is a fragmentary vertical sectional view approximately on the plane of the line 5—5 of FIGURE 3; and FIGURE 6 is a transverse vertical sectional view approximately on the plane of the line 6—6 of FIGURE 3.

Figure 1:
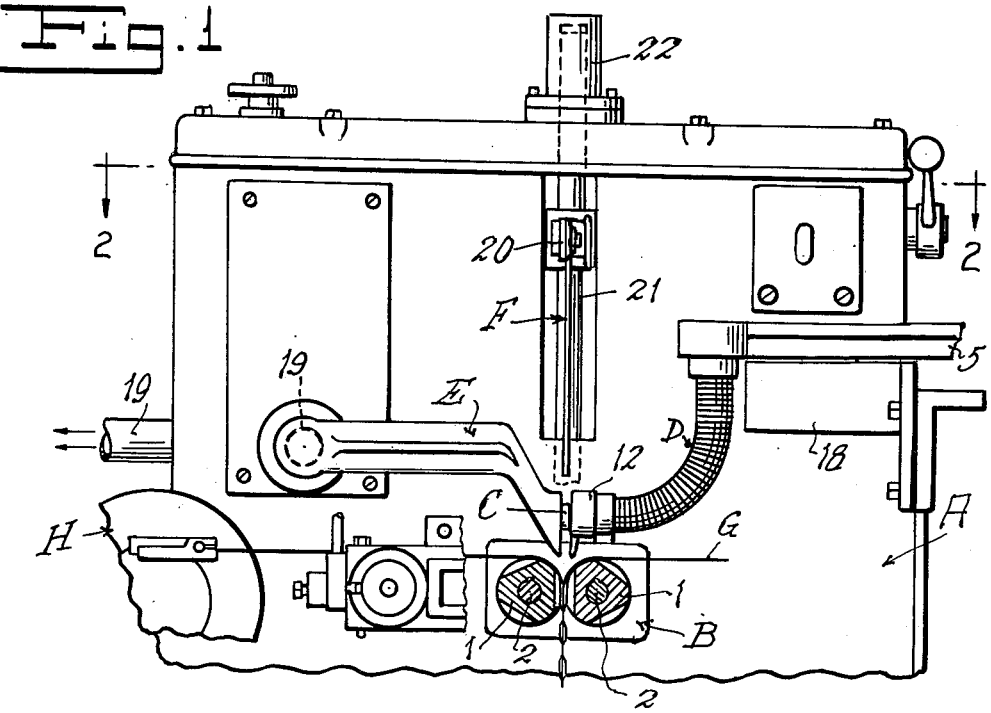
FIGURE 1 is a schematic fragmentary side elevational view of apparatus embodying the invention, portions being shown in vertical section.
Figure 2:
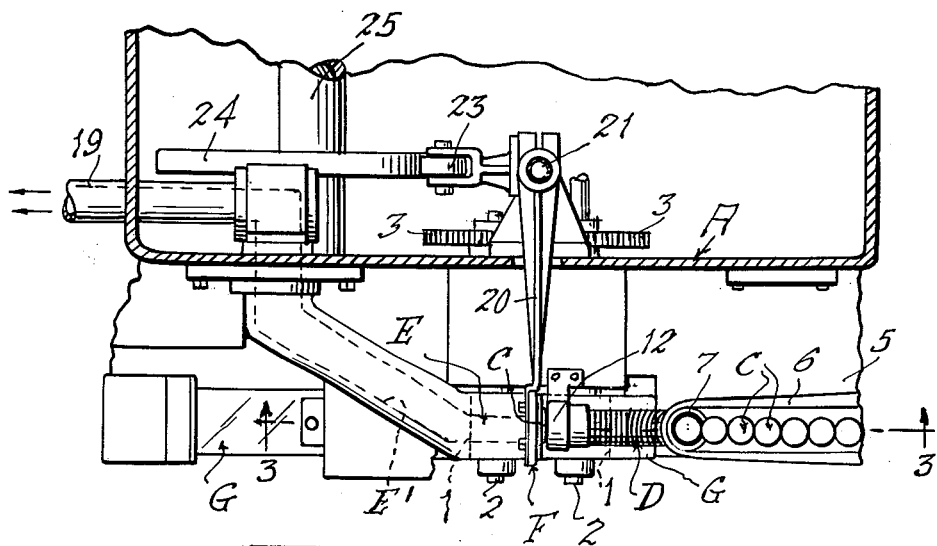
FIGURE 2 is a fragmentary horizontal sectional view approximately on the plane of the line 2—2 of FIGURE 1.

Specifically describing the illustrated embodiment of the invention, the machine comprises a main frame or casing A on which is mounted a packaging and sealing mechanism B of the type shown in said United States Patent No. 2,083,617. As shown, this sealing mechanism includes two sealing rollers 1 mounted on and rotated in opposite directions by shafts 2 which are drivingly connected by gears 3, one of which may be driven from any suitable source of power. The rollers have complemental registering recesses 4 to provide clearance spaces between them for the articles between the layers or webs G of packaging material, which are drawn by and between the rollers 1, the recesses being spaced circumferentially of the rollers and the rollers being rotated in timed relation to the deposit of the articles between the layers. In surrounding relation to the recesses 4, the peripheries of the rollers have serrated surfaces for crimping and sealing the layers of the packaging material and the rollers may be heated in any suitable manner where the packaging material is of the heat-sealable type. As shown, the layers or webs of packaging material may be fed from supply rolls H that are journaled on the machine in any suitable known manner.

The articles to be packaged are shown as approximately flat tablets C that are placed on a feeding table 5 that has a chute portion 6 for arranging the tablets in single file and leading them to a discharge opening 7 to which is connected one end of a flexible conduit D which is shown in the form of a helically coiled spring extending downwardly from the discharge opening and the other end of which is connected to an approximately horizontal outlet opening 8 that leads the tablets to the flat vertical face 9 of a suction head E above and close to the bight between the sealing rollers 1 and of an area greater than that of one side of the article. The suction head has a suction duct E' whose mouth opens through the face 9 in line with the end of the column of tablets.

While the structural details may be varied, one end of the conduit D is mechanically connected to the vibratory feed plate 5 as by a bushing 10 and the other end of the conduit has a similar bushing 11 connected to a bracket 12 mounted on the frame of the machine and having a flat vertical face 13 in parallel relation to the flat face 9 of the suction head and spaced therefrom a distance slightly greater than the thickness of the tablets C and of an area greater than the area of one side of an article and through which is formed the outlet opening 8. As best shown in FIGURE 3, said faces 9 and 13 terminate in close proximity to the webs of packaging material and above the bight of the sealing rollers and thus serve to guide the tablet between said webs; and said faces 9 and 13 also protect the edges of the leading article during its transfer from the column to the webs.

The feed plate 5 may be vibrated in any suitable manner, but for the purpose of illustration has been shown as secured to a plate 14 that is carried by a U-shaped bracket 15, the arms of which are attached to an electrical vibrator 16 of known type, such as the "Syntron" vibrator that is spring-mounted on the bottom wall 17 of a bracket housing 18 secured to the frame A of the machine as best shown in FIGURE 1. The upper surface of the said plate 5 may be slightly inclined downwardly toward the discharge opening 7 and the said plate will be vibrated in such a way as to cause the tablets to move along the chute 6 into the discharge opening where they will drop by gravity into and through the flexible conduit D, it being understood that the conduit will be of an internal diameter slightly greater than the diameter of the tablets and the convolutions of the helical spring forming the conduit will be closely related to each other. The gravitational action will cause the formation of a column of tablets as best shown in FIGURE 3 and the leading tablet will be pressed against the face 9 of the suction head E which is mounted on the frame of the machine and is connected by a pipe 19 to a suitable suction-producing apparatus. The leading tablet is thus disposed between the faces 9 and 13 of the suction head and the outlet bracket 12 and is held by the suction as well as friction incident to gravitational action on the column of tablets, from accidentally or prematurely dropping between the sealing rollers.

The invention contemplates the pushing of the leading tablet through the space between the faces 9 and 13 into proper position between the portions of the webs of packaging material passing between the sealing rollers, in timed relation to the rotation of the rollers, by any suitable mechanism. As shown, a pusher plate F formed of suitable material which will not break or damage the tablets, for example, a sheet of rubber, is mounted on a carrying arm 20 which is turn is mounted on a rod 21 that is vertically slidable in bearing 22 on the machine frame and reciprocated by suitable mechanism. For the purposes of illustration, the rod is shown as having a follower roller 23 connected thereto and following a cam 24 mounted on a drive shaft 25 which may be connected to any suitable source of power. The pusher plate is of a thickness somewhat less than the width of the space between the faces 9 and 13, and the cam 24 will be so shaped that the pusher plate is normally located in alignment with said space and its lower edge above the leading tablet as best shown in FIGURE 3; and in timed relation to the rotation of the sealing rollers 1, the pusher plate will be moved downwardly so as to push the leading tablet through said space and into proper position between the webs of packaging material as shown in FIGURE 4. The pusher plate is thus moved across the mouth of the duct E' through the suction head so as to cut off the effect of the suction on the tablets, and upon return of the pusher plate to its normal position, the action of gravity on the tablet plus the suction holds the leading tablet in the column in position to be pushed between the webs of packaging material for producing the next package. When the pusher plate is in its lower position as shown in FIGURE 4, it acts as a stop for the next tablet to be packaged, and as the pusher plate rises to its upper position, the tablet that has been held back in the conduit is released and the suction, together with the downward push or gravitational action of the succeeding tablets, moves the leading tablet against the face of the suction head and across the mouth of the suction duct E' as shown in FIGURE 3, where the tablet is held until it is pushed into downward position by the pusher plate F.

While the suction may be continuous, it may be desirable in some cases to provide a valve of the nature shown in Patent No. 2,653,434 for applying and relieving the suction at the mouth of the duct E' in timed relation to the movement of the pusher plate and the sealing rollers so as to, for example, cut off the suction as the pusher plate engages the leading tablet during the downward movement of the pusher plate and to apply the suction as the pusher plate rises past the leading tablet of the column.

While the now preferred embodiment of the invention has been shown for the purpose of illustrating the principles of the invention, it will be understood by those skilled in the art that the structural details of the apparatus and the steps of the method may be modified and changed within the spirit and scope of the invention.

I claim:

1. In a machine for feeding articles of the nature of tablets, a frame, a substantially horizontal vibrating chute on said frame having a downwardly directed substantially vertical discharge opening at one end thereof to receive a plurality of approximately flat articles and move them in file formation and deposit them in succession into said discharge opening, a feed conduit having an internal diameter slightly greater than the diameter of said articles having one end connected to said vibrating chute and communicating with said discharge opening, and an outlet bracket on said frame having a substantially horizontal outlet opening therethrough, said feed conduit having its other end connected to said outlet bracket and communicating with said outlet opening to receive said articles from said chute in a column, said outlet bracket having a vertical face of an area greater than the area of one side of an article and through which said outlet opening extends, an element on said frame having a vertical face parallel to and of an area at least as great as the area of the face of said outlet bracket and spaced therefrom a distance slightly greater than the thickness of one of said articles, the gravitational force on said column of articles pressing the leading article against said face of said element to hold the article against dropping out of said column, and a pusher movable downwardly between said vertical faces and across said outlet opening to push said leading article laterally out of said column and downwardly away from the outlet opening.

2. In a machine as defined in claim 1 wherein said element comprises a suction head having said vertical face and a suction conduit opening therethrough of smaller diameter than said outlet opening and opposite said outlet opening for holding said leading article by suction against said vertical face of the suction head.

References Cited in the file of this patent

UNITED STATES PATENTS

| | | |
|---|---|---|
| 1,781,036 | Swift | Nov. 11, 1930 |
| 2,083,617 | Salfisberg | June 15, 1937 |
| 2,097,610 | Wilsey | Nov. 2, 1937 |
| 2,103,387 | Salfisberg | Dec. 28, 1937 |
| 2,288,870 | Weber et al. | July 7, 1942 |
| 2,382,863 | Decker et al. | Aug. 14, 1945 |
| 2,499,969 | Quintrell | Mar. 7, 1950 |
| 2,653,434 | Salfisberg et al. | Sept. 29, 1953 |
| 2,747,185 | Effgen | May 29, 1956 |
| 2,747,351 | Whitecar | May 29, 1956 |
| 2,788,882 | Swartz et al. | Apr. 16, 1957 |
| 2,886,157 | Hall | May 12, 1959 |